United States Patent [19]

Sakumoto

[11] Patent Number: 4,850,549
[45] Date of Patent: Jul. 25, 1989

[54] SPEED CHANGER FOR A FISHING SPINNING REEL

[75] Inventor: Akinori Sakumoto, Tokyo, Japan
[73] Assignee: Ryobi Ltd., Hiroshima, Japan
[21] Appl. No.: 188,379
[22] Filed: Apr. 29, 1988
[30] Foreign Application Priority Data Apr. 30, 1987 [JP] Japan .............................. 62-66314[U]

[51] Int. Cl.⁴ .......................... A01K 89/01; F16H 3/08
[52] U.S. Cl. ................................ 242/255; 242/84.2 R; 242/84.1 J
[58] Field of Search ............... 242/211, 212, 213, 215, 242/84.2 R; 74/371, 372, 323

[56] References Cited

U.S. PATENT DOCUMENTS

| 865,613 | 9/1907 | Schreidt | 242/215 |
| 2,380,213 | 10/1945 | Boor | 242/215 |
| 2,807,965 | 10/1957 | Frank | 74/371 |
| 3,675,502 | 7/1972 | Sarah | 242/215 |
| 4,732,343 | 3/1988 | Maruyama | 242/211 |

FOREIGN PATENT DOCUMENTS 45-18252  7/1970  Japan .

Primary Examiner—Stuart S. Levy
Assistant Examiner—Katherine Matecki
Attorney, Agent, or Firm—Finnegan, Henderson, Farabow, Garrett & Dunner

[57] ABSTRACT

A fishing spinning reel speed changer wherein the winding handle is selectively attachable to the right and left sides of the reel. Two first and second speed change gears are integrally engaged with large and small speed change gears and movably fitted on a clutch axially displaceable on a hollow gear shaft which is rotatably supported through the spinning reel's body. A clutch lever and an attached bar may readily be assembled and disengaged to and from the spinning reel body for maintenance and when rotated move the bar to engage either the first speed change gear or the second speed change gear for low or high speed rotation.

2 Claims, 4 Drawing Sheets

SPEED CHANGER FOR A FISHING SPINNING REEL

FIELD OF THE INVENTION

The present invention relates to a speed changer for a fishing spinning reel.

BACKGROUND OF THE INVENTION

Conventionally, as disclosed in the Japanese Patent Application No. 18252/70, a fishing reel may have a two-stage speed changer. However, the drawback in such a device is that a fishing reel whose handle can be attached to both of the right and left sides of the reel, has not been able to use the the conventional two-stage speed changer.

SUMMARY OF THE INVENTION

An object of the present invention is to provide a spinning reel speed changer for use with a reel having a handle that is attachable to either of the right and left sides of the reel.

Another object of the present invention is to allow for easy change of the reel rotation speed.

A further object of the present invention is to allow for simple assembly, disassembly, checking, and maintenance of a reel rotation speed changer.

A further object of the present invention is to overcome the problems and disadvantages of the conventional reel speed changer.

DESCRIPTION OF THE DRAWINGS

The accompanying drawings, which are incorporated in and constitute a part of this specification, illustrate several exemplary embodiments of the invention, and together with the description, serve to explain the principles of the invention.

Figure 1:
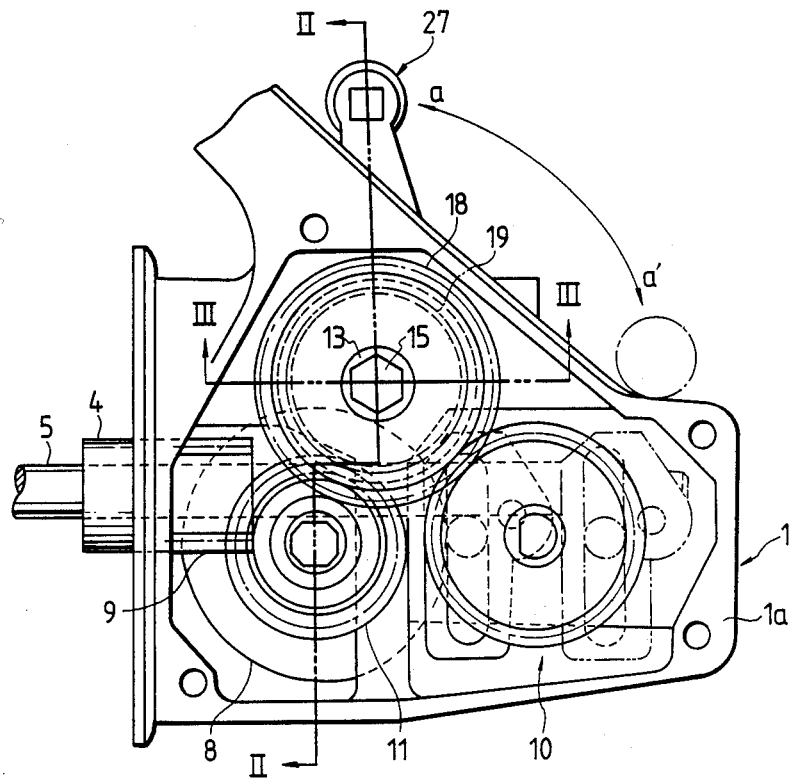
FIG. 1 shows a side view of an embodiment of a spinning reel including the speed changer of the present invention.

To achieve the above and other objects and in accordance with the purposes of the present invention, as embodied and broadly described herein, the speed changer of the present invention is provided with a hollow rotatable gear shaft rotatably supported through the body of the spinning reel such that a handle can be attached to either end of the gear shaft. Further, a master gear shaft is provided having a large speed change gear and a small speed change gear axially mounted. A first speed change gear is axially mounted on the gear shaft. A clutch is axially mounted on the gear shaft and is axially slidable between a first position and a second position. The clutch includes gear teeth for engaging the first speed change gear and the large speed change gear when the clutch is in the first position. The gear teeth further engage the second speed change gear and the small speed change gear when the clutch is in the second position. Clutch pin means extend radially from the clutch. A clutch cam is circumferentially mounted around the clutch and includes an annular groove extending axially with respect to the gear shaft. The groove receives the clutch pin means. A clutch lever is coupled to the clutch cam and is rotatable between a high speed position and a low speed position. The rotation of the clutch lever from the high speed position to the low speed position rotates the clutch cam to cause the clutch pin means to be moved along said annular groove in a first direction to slide the clutch to the first position to engage the gear teeth with the first speed change gear and the large speed change gear. Rotation of the clutch lever from the low speed position to the high speed position rotates the clutch cam to cause the clutch pin means to be moved along the annular groove in a second direction, opposite to the first direction, to slide the clutch to the second position to engage the gear teeth with the second speed change gear and the small speed change gear.

A clutch is fitted on the hollow gear shaft so that the clutch can be rotated together with the hollow gear shaft, and can be slid, in the axial direction of the clutch, and either engaged with or disengaged from the speed change gears. A clutch lever is composed of right and left portions, and a bar is attached thereto so that the clutch lever is formed symmetrically with respect to the transverse direction of the reel. The clutch lever is attached to the body of the reel so that the clutch lever is turnable. Further, this attachment allows for the axis of gyration of the clutch lever to extend in the transverse direction of the body of the reel. Clutch pins are slidably fitted in three types of grooves: oblique guide grooves provided in a clutch cam, capable of being turned by the clutch lever; slender grooves that slenderly extend in the axial direction of the support portion of the body of the reel; and an annular groove that is provided in the clutch along the circumference.

Regardless of the side to which the spinning reel handle is attached, the clutch lever can be easily operated by either of a right and a left hand to shift the spinning reel clutch into either high or low speed. The beneficial result achieved is that the user may quickly adjust the speed of the spinning reel depending on the size of a hooked fish, the magnitude of the pulling force of the fish, the direction of movement of the fish etc. Specifically, the user may employ the same hand for rotating the handle to wind a fishline to instantaneously put the spinning reel at either high or low speeds.

In the present invention, it is easy to assemble and disassemble the clutch lever from the body of the spinning reel and to perform the checking and maintenance of the clutch lever because the clutch lever comprises right and left portions and the bar is attached by screws.

DETAILED DESCRIPTION OF THE PREFERRED EMBODIMENT

Figure 2:
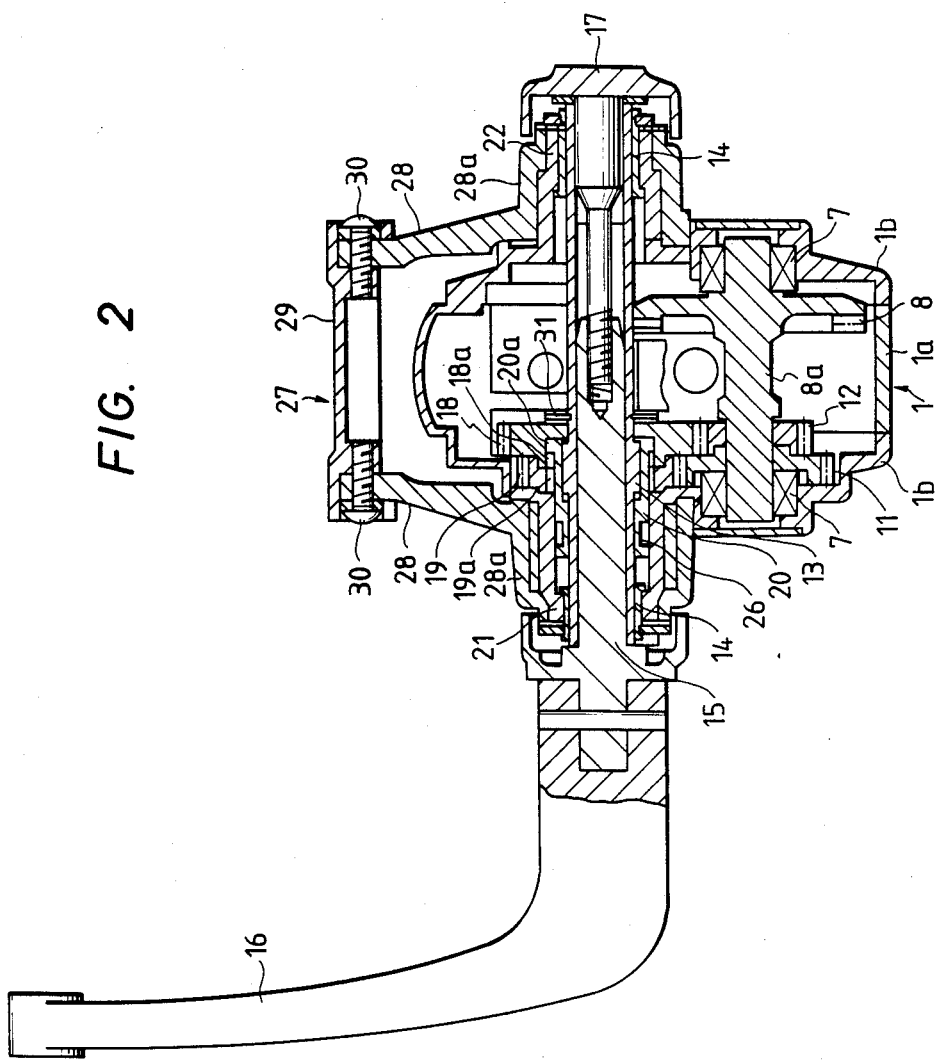
FIG. 2 shows a sectional view of an embodiment of the spinning reel of FIG. 1 along a line II—II.
Figure 3:
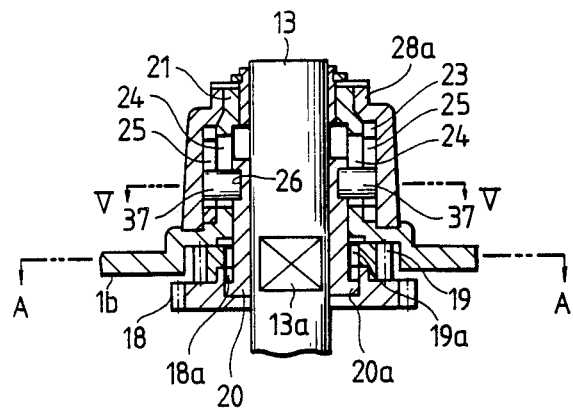
FIG. 3 shows a sectional view of an embodiment of the spinning reel of FIG. 1 along a line III—III.
Figure 5:
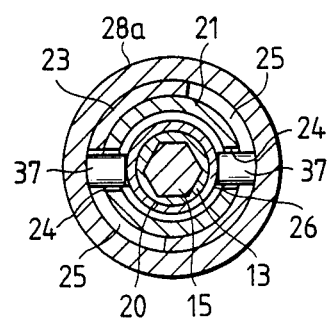
FIG. 5 shows a sectional view of an embodiment of the spinning reel of the present invention along a line V—V shown in FIG. 3.
Figure 4:
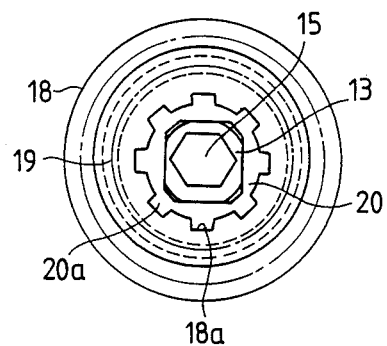
FIG. 4 shows a sectional view of the spinning reel of FIG. 3 along a line A—A.
Figure 7:
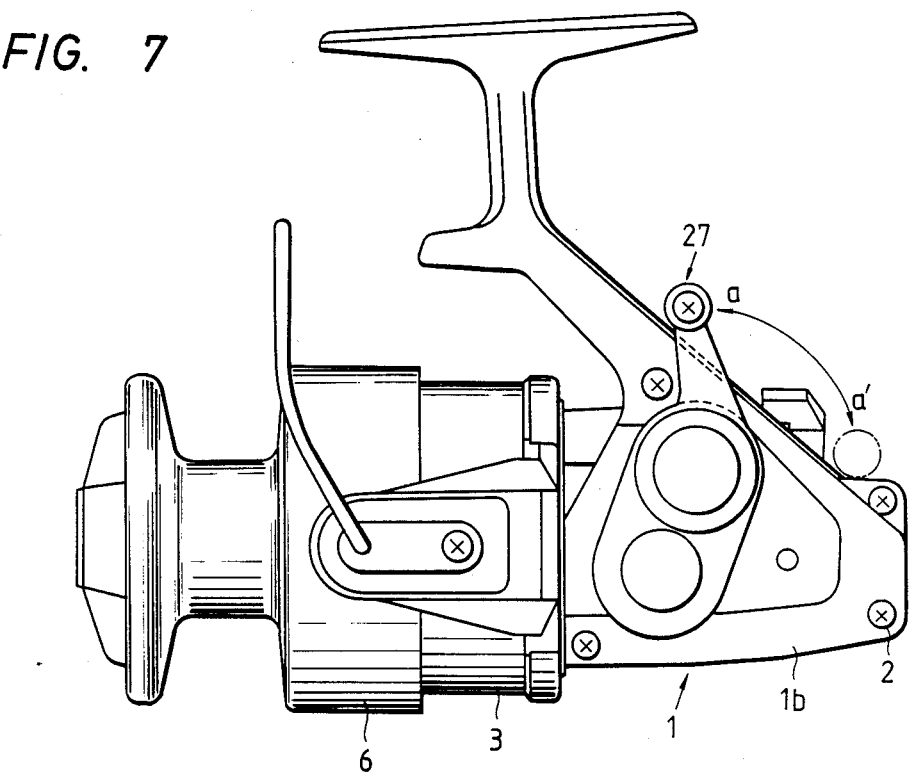
FIG. 7 shows a side view of an embodiment of the spinning reel of the present invention provided with the speed changer; and, FIG. 8 shows a cutaway rear view of an embodiment of the spinning reel of the present invention.
Figure 8:
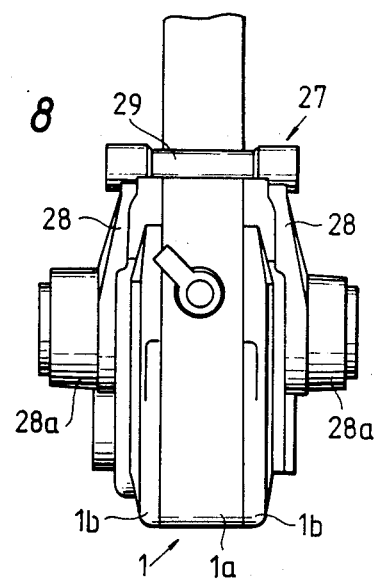

As shown in FIGS. 2, 7 and 8, two individual covers 1b are secured to the right and left sides of the casing 1a of the spinning reel body 1 by screws 2. As shown in FIGS. 1 and 7, a rotor 3 is rotatably supported by a quill 4 located in front of the reel body 1. A spool 6 is secured to a sliding shaft 5 slidably inserted in the quill 4. A master gear 8 is rotatably supported in the right and the left covers 1b, by bearings 7 and engages a pinion 9 on the quill 4. The sliding shaft 5 is movingly connected to the master gear 8 through a reciprocation mechanism 10. The rotation of the master gear 8 turns the rotor 3 in a prescribed position which reciprocates the spool 6 backwardly and forwardly to wind a fishline which is located on the spool. Large and small speed change gears 11 and 12, respectively, are integrally formed on the shaft 8a of the master gear 8.

A hollow gear shaft 13 is rotatably supported at both its ends with bushings 14. The hollow gear shaft 13 extends transversely through the reel body 1 in parallel with the master gear shaft 8a. As a result, the hollow gear shaft 13 is prevented from moving in the axial direction. A handle shaft 15, having a polygonal cross section, is fitted at one end with a handle 16. The handle shaft 15 is inserted into the hollow gear shaft 13 and a clamp screw 17 is inserted into the other end of the hollow gear shaft and tightened. The handle 16 can be attached to either of the right or left sides of the spinning reel to rotate the hollow gear shaft 13. Speed change gears 18 and 19, respectively, are rotatably fitted on the hollow gear shaft 13, and engage the small and large speed change gears 12 and 11 on the master gear shaft 8a.

As shown in FIGS. 2, 3, 4 and 5, an opening 13a is provided in a circular portion of the hollow gear shaft 13. A cylindrical clutch 20, having an internal opening which may be made to coincide with the hollow gear shaft opening 13a, is fitted on the hollow gear shaft 13. As a result, the clutch 20 can be rotated together with the hollow gear shaft 13, and can slide in the axial direction. The cylindrical clutch 20 is provided at one end with a plurality of projections 20a. The speed change gears 18 and 19 are provided with a plurity of recesses 18a, and a plurality of recesses 19a, respectively. When the clutch 20 is slid a prescribed distance in the axial direction the projections 20a, of the clutch, are fitted in the speed change gear's recesses 18a or 19a so that the clutch alternately is connected to one of the speed change gears. The movement of the speed change gears 18 and 19 in the axial direction is prevented by securing a stop ring 31 to the hollow gear shaft 13.

Figure 6:
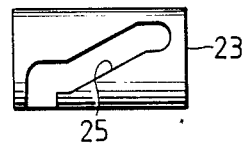
FIG. 6 shows a front view of a clutch cam in an embodiment of the spinning reel of the present invention.

Cylindrical support portions 21 and 22 are provided in the right and left covers 1b of the reel body 1. The clutch 20 is slidably fitted in the axial direction in the cylindrical support portions 21 and 22. As shown in FIG. 6, a cylindrical clutch cam 23 is rotatably fitted on the support portion 21. The circumferential wall of the clutch cam 23 is provided with guide grooves 25, which are located in mutually opposite positions, and extend obliquely along the axis of the clutch cam. The circumferential wall of the support portion 21 is provided with slender grooves 24 which slenderly extend in the axial direction of the support portion 21, and are located in mutually opposite positions corresponding to those of the guide grooves 25 of the clutch cam 23. The outside circumferential surface of the clutch 20 is provided with an annular groove 26 corresponding to the slender grooves 24 of the support portion 21 and the guide grooves 25 of the clutch cam 23. Both ends of clutch pins 37 are slidably fitted into the slender grooves 24, the guide grooves 25, and the annular groove 26.

As shown in FIG. 2, the clutch lever 27, approximately inverted U-shaped, is provided over the reel body 1 so that the axis of gyration of the clutch lever extends in the transverse direction of the reel body 1. As shown in FIGS. 1 and 7, to shift the clutch 20 the clutch lever 27 can be turned in directions a and a' at either the right or left sides of the reel body 1. The lower parts 28a, of the right and left portions 28 of the clutch lever 27, are cylindrically shaped and rotatably fitted on the support portions 21 and 22 such that the clutch lever 27 is rotatably supported. In order that the clutch can be turned together with the lower part 28a, the clutch cam 23 is fitted on the support portion 21 and fitted in one of the lower parts 28a of the right and left portions 28. A bar 29 is secured to the tips of the right and the left portions 29 of the clutch lever 27 by screws 30. As a result, the clutch lever 27 is formed symmetrically to the transverse direction of the reel body 1, and can be assembled and disassembled.

When the clutch lever 27 is in the position shown by the full lines in FIGS. 1 and 7 the clutch 20 is engaged with the speed change gear 18, and the spinning reel is at the high speed position. At that time, the turning force of the handle shaft 15 is rapidly transmitted to the hollow gear shaft 13, the clutch 20, the speed change gears 18 and the small speed change gear 12, the master gear 8, the pinion 9, and the rotor 3.

When the clutch lever 27 is shifted in the direction a' into the position shown by the dotted chain lines in FIGS. 1 and 7 the clutch cam 23 will turn. At that time, the clutch pins 37 remain engaged in the slender grooves 24, of the support portion 21, so that the clutch pins 37 are prevented from turning. The clutch pins 37 are pushed by the inner edges of the guide grooves 25 such that the clutch pins 37 are slid in the axial direction of the clutch 20, along the slender grooves 24, in correspondence to the shape of the guide grooves. Because the clutch 20 has an annular groove 26 fitted with the clutch pins 37, it is slid in the axial direction so that the clutch disengages from the speed change gear 18, and engages with the speed change gear 19 and, the large speed change gear 11. Consequently, the spinning reel is placed at low speed. Specifically, the turning force of the handle shaft 15 is slowly transmitted to the hollow gear shaft 13, the clutch 20, the speed change gears 19 and, the large speed change gear 11, the master gear 8, the pinion 9, and the rotor 3.

What is claimed is:

1. A fishing spinning reel shaped changer for winding fish line on a spool comprising:
   a body having right and left sides and a first hollow gear shaft rotatably extending through said body;
   a handle selectively attachable to said right and left sides of said body and including means for drivingly engaging said first hollow gear shaft;
   a first speed change gear and a second speed change gear rotatably fitted on said first hollow gear shaft;
   a second shaft extending through said body supporting a large speed change gear engageable with said first speed change gear and a small speed change gear engageable with said second speed change gear, said second shaft including a master gear for driving a rotor to wind the fish line onto the spool, and to reciprocate the spool;
   a clutch slidably mounted on said first hollow gear shaft for movement between a high speed position and a low speed position;
   to selectively rotationally couple one of said first and second speed change gears to said handle;

a clutch cam circumferentially mounted around said clutch; and a clutch lever including a right portion and a left portion and a bar means provided between said right portion and said left portion of said clutch lever in a symmetrical configuration, with respect to the reel said clutch lever being coupled to said clutch cam to rotate said clutch cam between said high speed position and said low speed position.

2. A fishing spinning reel speed changer according to claim 3, wherein:
said clutch cam including guide grooves, said right and left sides including cylindrical support portions having slender grooves therein, and said clutch including an outside circumferential surface having an annular groove; and
further comprising a clutch pin slidably engaging said guide grooves, said slender grooves and said annular groove.

* * * * *

UNITED STATES PATENT AND TRADEMARK OFFICE
CERTIFICATE OF CORRECTION

PATENT NO. : 4,850,549

DATED : July 25, 1989

INVENTOR(S) : Akinori Sakumoto

It is certified that error appears in the above-identified patent and that said Letters Patent is hereby corrected as shown below:

Claim 1, column 4, lines 66-67, change "position; to" to --position to--.

Claim 2, column 6, line 2, change "3" to --1--.

Signed and Sealed this

Twenty-first Day of August, 1990

Attest:

HARRY F. MANBECK, JR.

Attesting Officer     Commissioner of Patents and Trademarks